Feb. 13, 1945. P. MODIGLIANI 2,369,481
MANUFACTURE OF SPUN GLASS FIBERS
Filed March 16, 1939 5 Sheets-Sheet 1
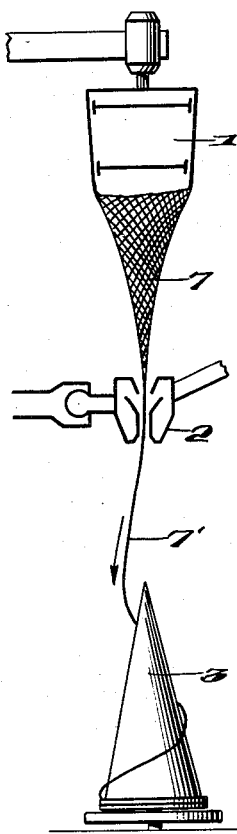
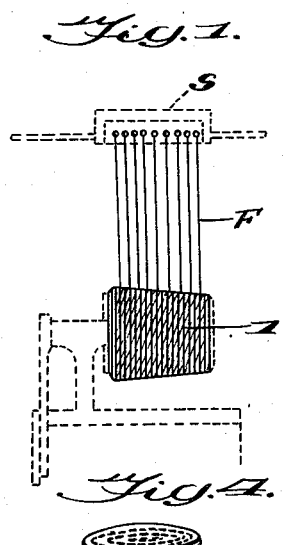
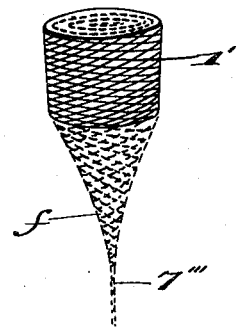
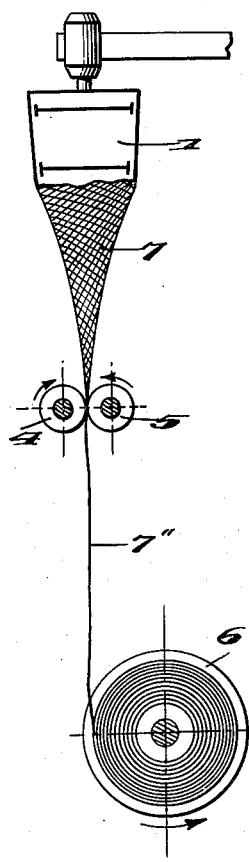
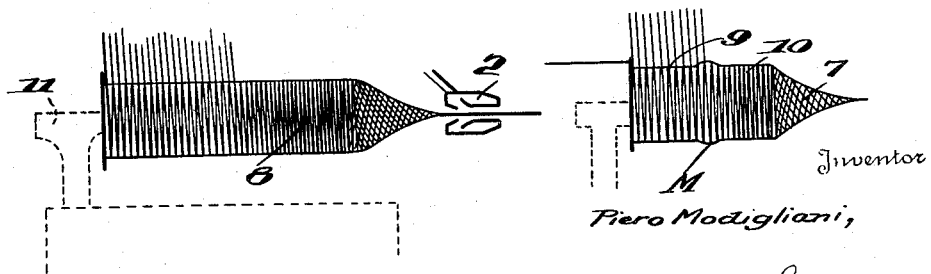
Inventor
Piero Modigliani,
By Dorsey, Cole & Garner
Attorney Feb. 13, 1945.  P. MODIGLIANI  2,369,481
MANUFACTURE OF SPUN GLASS FIBERS
Filed March 16, 1939  5 Sheets-Sheet 2
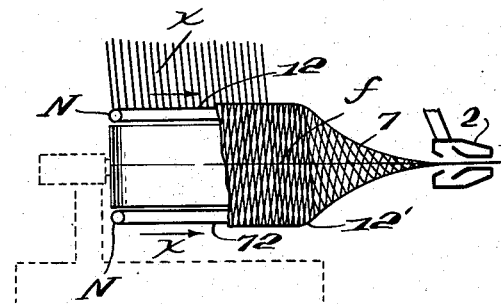
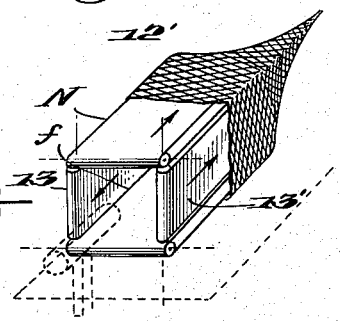
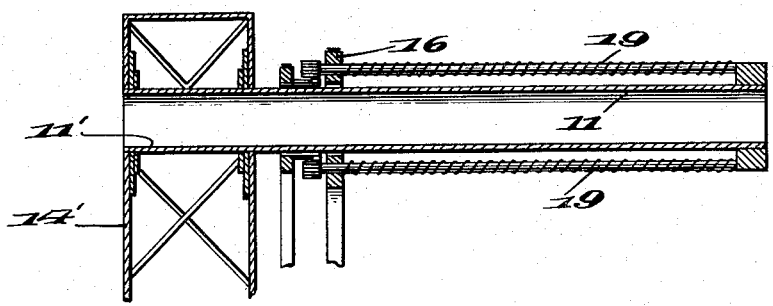
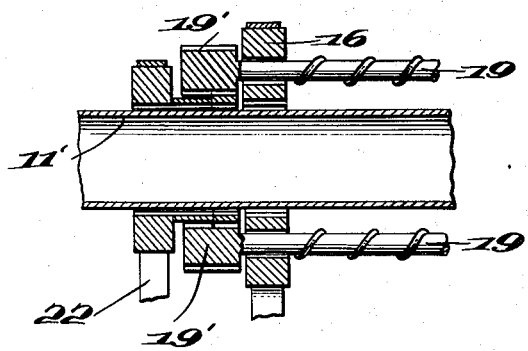
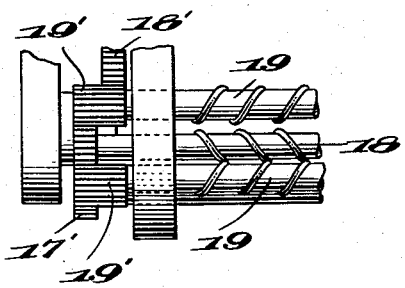
Inventor
Piero Modigliani,
By Dorsey, Cole & Garner
Attorney

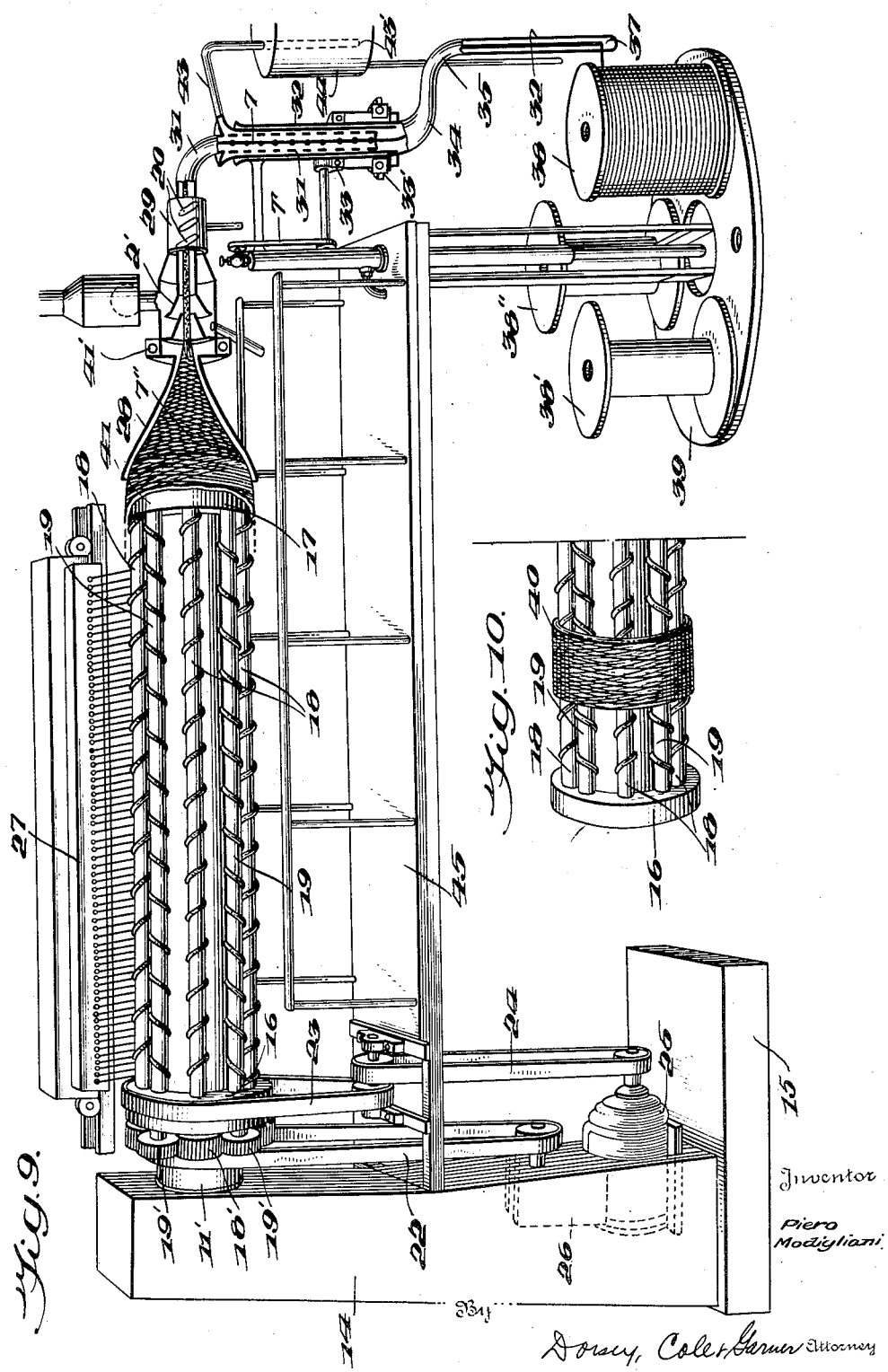

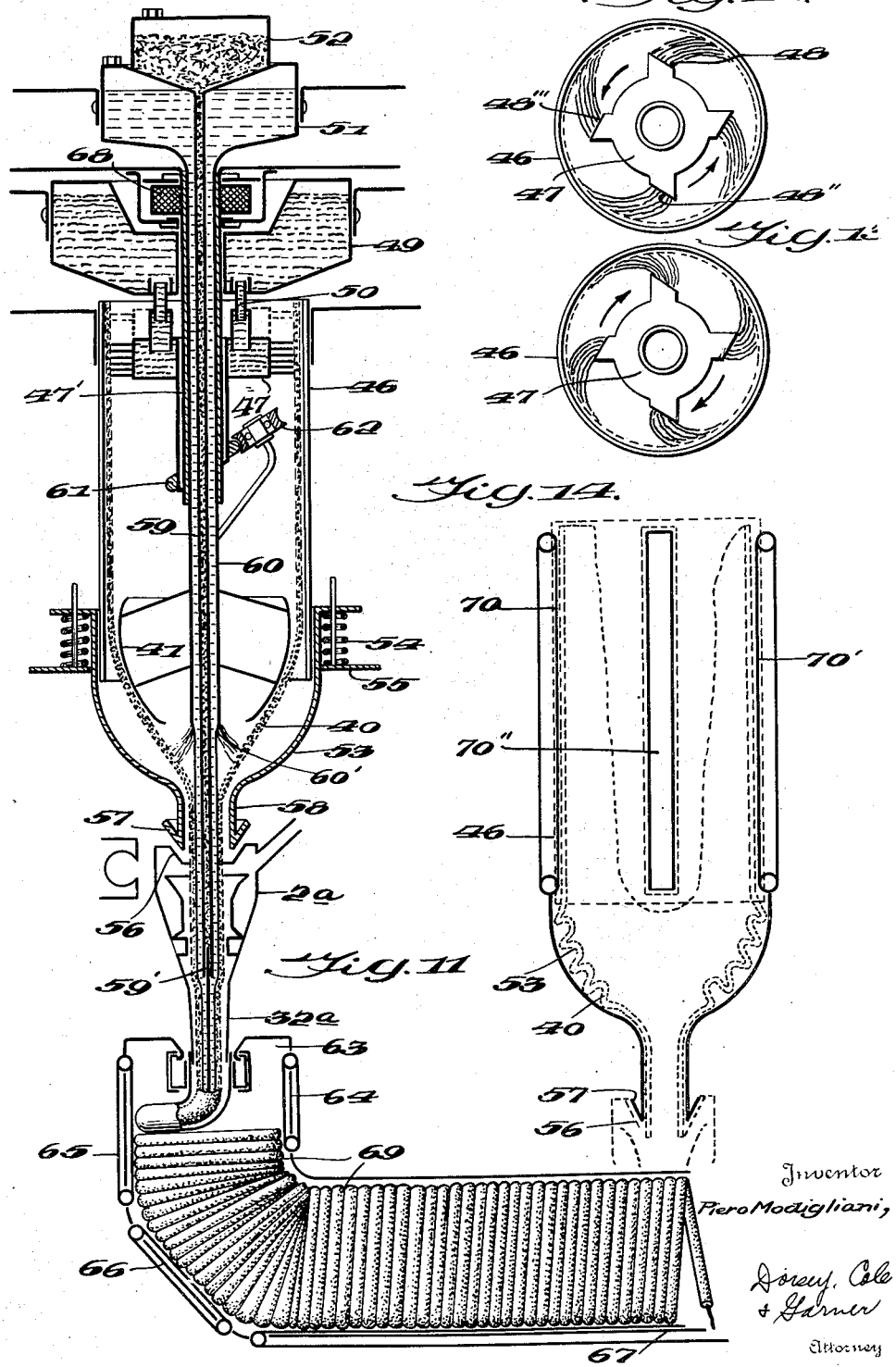

Feb. 13, 1945.  P. MODIGLIANI  2,369,481
MANUFACTURE OF SPUN GLASS FIBERS
Filed March 16, 1939  5 Sheets-Sheet 5
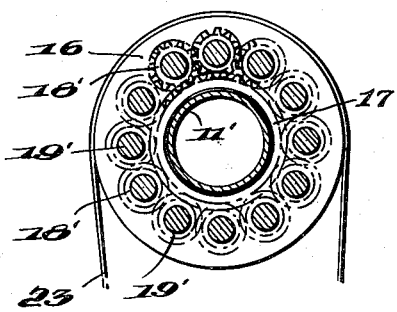
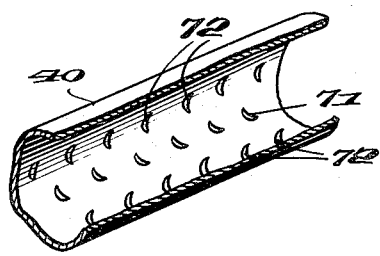
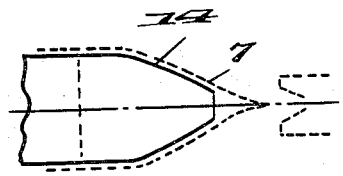
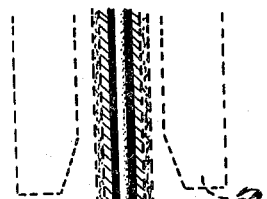
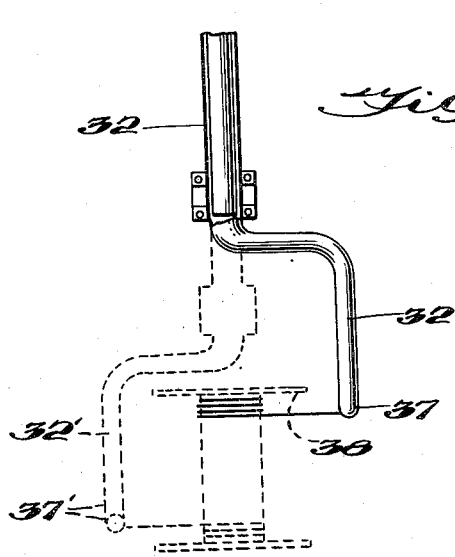
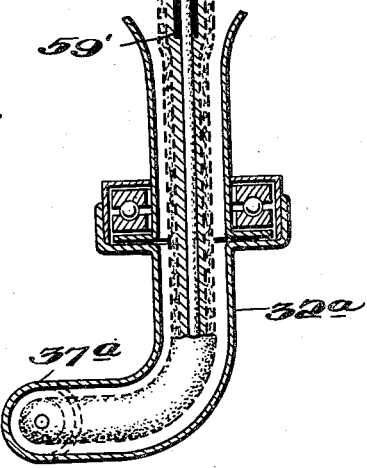
Inventor
Piero Modigliani,
By Dorsey, Cole & Garner
Attorney Patented Feb. 13, 1945

2,369,481

UNITED STATES PATENT OFFICE 2,369,481

MANUFACTURE OF SPUN GLASS FIBERS

Piero Modigliani, Leghorn, Italy, assignor to Owens-Corning Fiberglas Corporation, Toledo, Ohio, a corporation of Delaware Application March 16, 1939, Serial No. 262,273
In Italy March 22, 1938

11 Claims. (Cl. 28—1)

According to my previous inventions spun glass has hitherto been obtained from a felt with crossed fibers, produced first on drawing and winding drums according to Italian Patent No. 337,364 of March 11, 1935, and then cutting strips therefrom and subsequently paralleling the filaments thereof by mechanical or pneumatic stretching. The material is obtained immediately from a mat substantially in the form of a strip, which is then twisted. According to the present invention use is made of cops, spindles or bobbins, which are slightly conical, according to applicant's U. S. application, Serial No. 259,706, filed March 3, 1939. In that application, a strip is drawn from the body formed on the tube, the drawing taking place at the smaller end of the tube.

This spun material is characterized by greater uniformity and provides better interlacing of the elementary fibers so that, immediately after the stretching, yet being paralleled, the fibers remain positioned in a certain crossed design which, according to the variation of the angle, reproduces over the entire outline of the spun material the crossed design of the tubular body used for starting. The resulting spun material has, so to speak, a structure very similar to spun tubular hose. According to the invention, a core consisting of a thread of any kind, of textile fiber, metal or other material, can be inserted in the spun material thus obtained, during the formation thereof. The material itself does not require special twisting and is put on the market as produced by the stretching, but may be twisted also.

With this new material also the spinning can be done directly from the spinning or drawing furnace, passing from an intermediate state of stratification with crossed fibers on a drawing cylinder or equivalent member, through a mechanical or pneumatic stretching, to the direct collection of the spun material on a bobbin or drum without interrupting the continuity thereof.

The invention also relates to collecting the threads at the interior of a fixed, that is, non-rotatable tube, and also of collecting the mat or strip at the interior of another fixed tube, or on a fixed bobbin by means of a rotating arm operated by the action produced by the compressed air passing from a tube which carries the mat, through the action of the air passed from the injector nozzle.

The invention also relates to the possibility of compensating for the delivery of the drawing or spinning plate or plates with that of the absorption and digestion of the injector nozzle, and that of the latter with the capacity of the member which deposits the mat in the storage container. The compensating apparatus functions automatically.

Finally, it relates to the insertion of an electrical conductor of aluminum, copper or the like in the tubular spun material while it is being formed, and in special cases to distribute successively at the interior of the tubular structure strata or layers of different kinds, for example, first an insulating layer, then a conductive layer, and at the exterior a layer of insulating material which can also have sizing, stiffening or finishing characteristics, all by means of the air drawn in and taken up by the injector nozzle.

The invention is illustrated on the accompanying drawings by way of example only.

Figure 1 shows diagrammatically the production of the tubular layer of crossed glass fibers deposited on a tubular core carried by the mandrel of the drawing machine.

Figure 2 shows diagrammatically the method of forming the tubular spun material by stretching by means of the injector nozzle taking the mat simultaneously from the entire periphery of the tubular body on the mandrel of the spinning machine.

Figure 3 shows diagrammatically the method of spinning the tubular material by means of mechanical stretching instead of pneumatic stretching according to Figure 2.

Figure 4 shows diagrammatically the general method of forming the tubular spun structure by stretching the materials taken from the margin of a spindle charged with crossed glass fibers.

Figure 5 shows diagrammatically a method of continuously spinning the tubular structure taken from the cylinder on which the glass fiber is deposited.

Figure 6 shows diagrammatically a modification of Figure 5.

Figure 7 shows diagrammatically a system for progressively advancing the fiber layer formed on the winding drum consisting wholly or in part of endless bands which move with their outer part to the take-off end.

Figure 8 represents diagrammatically a perspective view of Figure 7.

Figure 9 is a perspective view of a complete continuous spinning arrangement, executed simultaneously with the drawing, passing through the cross-wound stage on a drum.

Figure 10 shows a detail of Figure 9.

Figure 11 shows another plant for continuous spinning with an arrangement of the threads at the interior of a fixed cylinder.

Figures 12 and 13 are transverse sections of the rotary member of the spinning plate.

Figure 14 is an axial section and in part an elevation of the fixed cylinder and the compensating member.

Figure 15 is a diagram of the rotating system on a long steel tube carried resiliently by a transverse member.

Figure 16 is a section showing the engagement of the ratchet wheels or gears which carry the mechanism for checking the advance.

Figure 17 is a top view of the engagement of the gear members for producing a movement reverse to that for checking the advance.

Figure 18 shows the engagement of the pinions of all the bars where they rotate alternately in opposite directions.

Figure 19 shows a finished mat produced with the impressions or imprints which form at the interior thereof by means of which the fiber sheathing, deposited on the drum during the drawing operation is advanced.

Figure 20 shows a detail of the end of the winding drum such as that of Figure 9.

Figure 21 shows the details of a compensating or traverse system for winding the mat on the bobbin with the reaction movement of the fluid in an arrangement as shown in Figure 9.

Figure 22 is an enlarged showing of the method of introducing a liquid core into the tubular structure through injection and compensating distributors of the mat in a fixed cylinder, in an arrangement of the type shown in Figure 11.

Referring specifically to the figures of the drawings:

In Figure 1 is shown the spindle 1 mounted on a conical core and the spindle is also slightly conical. The spindle is arranged to receive the fiber filaments drawn from the drawing plate 5, which, in the case of glass fibers, forms part of a drawing furnace.

In Figure 2 is shown the injector nozzle 2 which deposits on the spindle 3 the mat or strip 7' taken from the cone of glass fiber 7 formed from the margin of the spindle 1 simultaneously from the entire outline or periphery of the spindle mounted on the spinning machine.

According to Figure 3 the tubular spun structure 7'', winding directly upon the drum 6, is taken from the cone 7 by means of the rollers 4, 5.

In Figure 4 is shown the formation of the tubular structure in which there may be simultaneously inserted a core of metallic thread f which remains incorporated in the tubular structure 7'' during the spinning, with either pneumatic or mechanical stretching. The obvious advantage thereof is that, for example, the conductor cables can be directly inserted in the tubular spun glass structure, for example copper or aluminum conductors, during the spinning, without necessitating any twisting.

Figure 5 shows how it is possible to spin continuously with the new tubular structure by means of the crossed arrangement of the fibers, but without interruption between the drawing and the spinning. Assuming that, by means of any suitable means, the layer deposited on the winding drum 8 is displaced or moved progressively toward the right, as a result of the slight conicity of the drawing and the spinning cylinder. The cylinder thus serves simultaneously for the dual purpose of drawing and spinning, preferably by means of injector nozzles. The drawing takes place at the left and the spinning at the right of the cylinder.

In Figure 6, the part 9 serving for the drawing is separated by a bulge M from the part 10 which serves for beginning the spinning, that is, for beginning of converting the body 7, of conic form, by stretching effected pneumatically by means of the injector nozzle 2. In this embodiment the conicity 9, 10 is such that the bulge M naturally determines the sliding movement of the entire layer of crossed threads toward the right, until this layer becomes of sufficient thickness.

Figure 7 shows the advance toward the right of the endless bands N, with their outer runs moving toward the right, that is, in the direction of the arrows x, x' progressively carrying the layer of crossed fibers toward the right where the aspirator 2 forms the cone 7 by drawing.

The crossed fiber arrangement takes place at the left part 12 of the bands, and the removal through the pneumatic stretching at the part 12'.

The same parts are shown diagrammatically on Figure 8; 13, 13' show two other sides formed by straight endless bands, that is, circulating toward the right. They may also be smooth and somewhat reentrant or provided with circulating bands.

Figure 9 shows a complete arrangement for continuously drawing and spinning glass fiber, but may also be used for other threads obtained artificially from widely different materials.

Referring to this figure, 11' is a shaft, preferably in the form of a seamless steel tube, relatively flexible, its left end affixed solidly in a seat provided in the column 14 extending from wide cast iron base 15 which can extend to the left sufficiently to assure the stability of the machine; 16 is a ring collar mounted slidably on the hollow shaft 11', to which there is connected slidably another collar 17, at the opposite free end thereof. The two collars are interconnected by parallel bars 18, 19 rotatably mounted in said collars. The bars 18 each carry a raised, helicoidal threading with rounded angles; the bars 19 each carry the same threading with the same pitch but directed reversely to those of the bars 18, and the bars 18 alternate with respect to bars 19. Bars 18 carry pinions 18' and bars 19 carry pinions 19'. The pinions 19' are longer than the pinions 18', and all engage with an internal gear 17 (Figure 18) connected with a pulley receiving rotary movement from a belt 22 which in turn is driven from a transmission 26 serving to govern the rotational velocity of the bars 18, 19 relative to the rotation imparted thereto through the ring collar 16 driven by the belts 23, 24 from the motor 25 which, through said transmission 26, also actuates the belt 22. A spinning or drawing plate 27 is mounted on a furnace adapted to describe oscillatory movement. The cone 7'' of spun glass is produced by the nozzle 2'; 28 is an external guide cone; 29 is a sleeve in the form of a housing for regulating the pneumatic pressure coming from the openings 20; 31 is a guide tube for the strip communicating with the outlet of the nozzle 2', so that the pressure carries the strip 7 to the end 37 of the tube 32, which is an extension of the tube 31. By means of ball bearings 33, 33' the tube 32 may rotate around the tube 31 and also has two elbows 34, 35 by means of which it can be carried around the rotational axis of the bobbin 38. Rotation is imparted to the tube 32 by the same compressed air which advances the strip, which at the end, before the opening 37, is drawn in a direction perpendicular to the corresponding diametral plane which passes through the axis of the bobbin 38. The reaction is completed by a well known reaction phenomenon. The tension of the strip 7 on the bobbin 38 is regulated by the pressure of the air itself. The bearings 33, 33' which facilitate the rotation of the tube 32 can be raised and lowered by means of a suitable traverse mechanism T, to distribute the strip on the spool or bobbin, the tube 32 with its bearings and brackets, being shown near its upper limit of travel. On the revoluble platform 39 are mounted three bobbins 38, 38', 38" which can be held in position for charging of the strip by means of the tube 32 which rotates around the bobbin being charged.

Referring to Figure 10, 40 is part of a mat deposited on the bars 18, 19. The deposition is effected by means of the long oscillating draw plate 27. In order that the mat be deposited, that is, formed, the bars 18, 19 rotate in a direction opposite the advance to the right. In this movement the strip undergoes a twisting which corresponds to the rotation of the structure 16, 17, 18, 18, 19, 19, .... The outer cone 28 is mounted rotatably on the body of the nozzle 2' by means of ball bearings 41'; 41 is the inner cone which serves to guide and even smooth the filament interiorly which is directed toward the nozzle 2'.

In order to size or otherwise treat the strip a tube 43 extends by its part 43' into the receptacle 44. The tube 31 is provided with perforations through which the sizing liquid is drawn from the receptacle 44 and sprayed on the mat or strip 7'. A platform or framework 45 serves for supervising the winding drum from any desired height.

With a plant of this type it is possible to pass uninterruptedly from the drawing through all the ordinary intermediate formations, with crossed thread cylinders, to the winding of the slightly twisted strips on bobbins.

However, as the spun tubular structure is not generally twisted, all of the parts below the nozzle 2' can be disposed on the same axis of the winding drum, rotating in the same direction and at the same velocity.

Referring to Figure 11, which also represents a continuous spinning plant, starting directly from the formation of the fibers, 46 is a fixed tube of relatively large diameter mounted upon a vertical axis. A hollow rotating body 47 carries the spinnerets 48, 48', 48", 48'" disposed radially and with openings provided on their planes inclined to the respective radii. In Figures 12 and 13 the arms are shown as short, by reason of lack of space, but actually the spinnerets may be located at the ends of relatively long arms so as to prevent the threads passing from the spinnerets from contact with the arm of the adjacent spinneret drawing device. A furnace or receptacle 49 is provided for molten glass and 50 is a fixed annular passage which establishes hermetic communication of the hollow member 47 with the receptacle 49, while permitting the member 47 to be mounted rotatably by being accurately connected with the hollow shaft 47' connected directly or indirectly with the rotor of the motor 68. Passing through the hollow shaft 47' is the guide 59 which communicates with the receptacle 52 containing, for example, molten metal, while a tube 60 communicates with receptacle 51 and contains, for example, a thermally liquefied or melted mass of electrical insulating material. The felt is deposited by the spinnerets at the interior of the tube 46, at the upper part thereof. The ring or collar 61, guided on the ball bearing 62, assures axial oscillatory movement to the part 47 with the corresponding spinnerets, so that the glass fibers are deposited in crossed position at the interior of tube 46. In order that the felt will be uniformly carried in the downward direction the endless bands 70, 70', 70" are provided, which pass through the openings of the tube 46 (Figure 14) and are guided by the rotating rollers with regulable speed, so that their inner traverses are continually straight from above downward. It is also possible to avoid the use of the bands 70, 70', etc., by the felt descending through gravity and enlarging the tube slightly conically toward the bottom.

A plate 53 in the form of a large-bellied cup with a branch 58 terminates in a conical surface 57 which functions as a valve with respect to the seat 56 of the injector nozzle 2a; 54 is the spring mounted on the member 55 which forces the flange 57 of the cup 53 up when the nozzle 2a draws the felt 40 without it touching the cup 53. Under these conditions the suction produced on the felt is reduced in proportion as the air enters also between 56 and 57, and not solely through the injector proper (Figure 11). When, instead, the injector does not sufficiently attract the felt 40 it is supported on the cup 53 and, overcoming the action of the spring 54, causes the conical surface 57 to adhere to the surface 56. The suction of the nozzle then becomes stronger. In this manner the charging capacity of the nozzle is perfectly and automatically balanced with the production capacity of the spinnerets 48, 48', 48", 48'".

A fixed or non-rotatable tube 63 is disposed below the injector nozzle, the upper tube 46 also being non-rotatable. The strip may be passed through a tube similar to that shown in Figure 9, with suitable application, by spraying or otherwise, of the size and electric insulation, these being applied by similar means against the inner wall of the tube 63. The vertical endless bands 64, 65 carry the strip downwardly which is stratified by centrifugal force at the interior of the tube 63. The endless band 66 is inclined while the endless band 67 is horizontal and carries the already tubularly wound strip in several layers to the point of use and storage.

In Figure 11 the strip or mat is shown as a single spiral layer, but it can, of course, be arranged crossed by suitable oscillatory movement of the tube 32a. Use can also be made of a kind of oscillatory movement composed of a large oscillation in which a small one plays and thus impart consistency to the tube formed from the wick or strip without it being necessary to give it an inner core, also making use of the stratification in the upper tube 46.

While the spun structure is formed, a liquid is sprayed from the mouth 60' of the tube 60, along the inner wall of the cone 40, this liquid being, for example, electrical insulating material. A low temperature fusing metal, such as aluminum, may be sprayed at 59' which is conveyed by the tube 59. If the material sprayed at 60' is also a good heat insulator it is also possible to prevent the spun glass from contacting directly with the metal. It all depends on the melting point of the metal, the insulating material and the glass, and chiefly on the degree of temperature transmitted from one material to the other.

Figures 12 and 13 show the passage of the jet of threads emitted from the spinnerets whereby they rotate in one direction rather than in the other.

The continuous spinning system shown in Figure 11 has the advantage of providing cores, linings or the like of any kind and composition at the interior of the tubular structure, according to the temperature which the glass can withstand, from liquid solutions to masses melted by heat, and this without providing expensive plants. It is, of course, possible to introduce or insert an already prepared thread of spun copper or aluminum wire in the glass tubular structure and wind it from a reel located at a higher level, particularly with respect to the higher coefficient of electric conductivity of the spun conductive material.

The body of the spinning mechanism may be arranged so as to be easily inspected, by raising it from the tube 46, whereby the efficiency of the nozzles may be verified.

The continuous operation of the spinnerets is assured, aside from the hydrostatic pressure, by the centrifugal force with which the glass is projected. The directions of the glass threads, that is, their inclination with respect to the radius of the tube 46 is the resultant of the mean peripheral velocity of the spinneret and the centrifugal force calculated according to the radial distance of the spinning device, rather than the hydrostatic pressure of the glass in the central member 47 thereof.

Figure 15 illustrates diagrammatically the mounting of the long member to be substituted for the drum mounted by means of bearings on the fixed hollow steel shaft 11' carried by the cross frame 14'.

Figures 16 and 17 show a method of producing opposite rotation on adjacent bars 18, 19 provided with helicoidal threads of opposite pitch. The pinions 19', 19' . . . mesh with the planetary gear 17 while the pinions 18' mesh only with the respective gears 19', as also shown clearly on Figure 18. The peripheral or angular velocity of the gear 17 may be varied by means of the transmission 26, and therewith the advance of the felt.

Figure 19 shows a piece of felt with inner imprint determined by the helicoidal threads of the bars 18, 19. These impressions may be made to disappear while the felt 40 passes over the conical smoothing plate 41 (Figure 20).

Figure 21 shows the device for distributing the mat or strip on the bobbins, in different positions (high and low) of production, this being a detailed part of the plant shown in Figure 9, which is operated by a traverse mechanism T.

Figure 22 shows a mechanism for distributing the mat intended for use with the plant shown in Figure 11. As shown therein, in enlarged scale, there issues from the mouth 59' of the tube 59 the material which is twisted from the insulating material 51', which may be coming from the receptacle 51 which in its turn is twisted or wrapped with the tubular structure 7'. It is thus possible directly to obtain the spun tubular structure provided or lined interiorly with one or two layers of different materials, of different function; and it is also possible to produce a structure comprising an electrical conductor insulated by an outer sleeve, for example of varnish or Bakelite, and an inner sleeve of glass filaments.

The foregoing applications are not limited to glass threads but also include other artificial threads produced by spinning or drawing. The individual devices above and below the injector nozzle of Figures 9 and 11 can be interchanged.

The invention has been described and shown by way of example only, it being apparent that numerous modifications can be provided therefor without departing from the scope of the invention.

What I claim is:

1. In an apparatus of the class described, a winding drum for accumulating a mat formed of a plurality of artificial filaments in crossing relationship at a portion thereof, an extension from said first portion from which the mat is withdrawn, a bulge on the drum separating said portion and extension, and pneumatic stretching means at the end of said extension for withdrawing the mat of crossed filaments therefrom.

2. In an apparatus of the class described, a body for accumulating a mat formed of a plurality of crossed artificial filaments incorporating a plurality of conveyors for transferring said crossed filaments from one portion of the body to another portion thereof, and stretching means associated with said last mentioned portion of the body for withdrawing the mat of crossed filaments therefrom.

3. The combination set forth in claim 2 wherein said conveying means is in the form of endless bands.

4. The combination set forth in claim 2 wherein said conveying means is composed of helically arranged protuberances on a plurality of rotary members.

5. In an apparatus of the class described, a body for accumulating a mat formed of a plurality of crossed artificial filaments comprising a plurality of rotary rods extending across the field of the delivery of the filaments, means for rotating said body, means for imparting rotation to adjacent rods in opposite directions, helical projections on the surfaces of said rods arranged in reverse directions on adjacent rods whereby the rotation thereof imparts axial movement to the mat formed by the artificial filaments, pneumatic means for stretching the mat delivered from the end of said body into a strand of tubular formation, means for treating the strand and means for winding the strand on a bobbin.

6. The combination set forth in claim 5 wherein means is provided for the treatment of the strand prior to the winding thereof on the bobbin.

7. The combination set forth in claim 5 wherein said last mentioned means comprises a rotary arm driven by the reaction of the driving air of the strand issuing therefrom, and means for traversing the open end of said arm parallel to the axis of the bobbin.

8. In an apparatus of the class described, a body for accumulating a mat formed of a plurality of crossed artificial filaments comprising a plurality of rotary rods extending across the field of the delivery of the filaments, means for rotating said body, means for imparting rotation to adjacent rods in opposite directions, and helical projections on the surfaces of said rods arranged in reverse directions on adjacent rods whereby the rotation thereof imparts axial movement to the mat formed by the artificial filaments.

9. In an apparatus of the character described the combination of means delivering a plurality of artificial fibers, a drum and means for revolving the same to wind the fibers upon the drum, means associated with the drum and movable axially in respect thereto engaging said fibers and moving the same axially in a single direction upon the drum, and means associated with the drum and adjacent one end thereof for withdrawing the fibers therefrom.

10. In an apparatus of the character described the combination of means delivering a plurality of artificial fibers, a revoluble carried disposed in cooperative relation thereto, a plurality of flexible transmission members each movable in a closed path and travelling in a direction axially of the carrier, and means for uniformly actuating said transmission members at a predetermined speed.

11. In an apparatus of the character described the combination of means delivering a plurality of artificial fibers, a revoluble carrier disposed in cooperative relation thereto, a plurality of flexible transmission members each movable in a closed path and travelling in a direction axially of the carrier, means for uniformly actuating said transmission members at a predetermined speed, and means at least in proximity to the terminal ends of said transmission members for withdrawing the fibers from the end of the carrier.

PIERO MODIGLIANI.